Patented Aug. 9, 1932

1,870,806

UNITED STATES PATENT OFFICE

LEON W. GELLER, OF HAMBURG, NEW YORK, ASSIGNOR TO NATIONAL ANILINE & CHEMICAL CO. INC., OF NEW YORK, N. Y., A CORPORATION OF NEW YORK

AZO COLORING MATTER SOLUBLE IN BENZENE

No Drawing. Application filed December 23, 1925. Serial No. 77,373.

This invention relates to the manufacture and production of new azo coloring matters which are soluble in aromatic hydrocarbons, oils, fats, soaps, waxes, varnishes, etc., and are of value for coloring the same. In particular, the invention contemplates the production of azo coloring matters which are derivatives of the naphthols, more especially beta-naphthol, and which possess the above mentioned characteristics and properties. The material colored by the new azo coloring matters also forms a part of the present invention.

It is well known that the coloring matters produced by coupling diazotized aniline or aminoazobenzene or a homologue thereof, or of an aminonaphthalene, with phenols of the benzene and naphthalene series, more particularly naphthols and especially beta-naphthol, are more or less soluble in aromatic hydrocarbons, oils, fats, soaps, waxes, etc., and are employed in coloring the same. Their usefulness, however, as coloring matters for oils, fats, waxes, etc., is largely a function of their solubility in said substances or of their capability of producing highly dispersed or colloidal solutions or admixtures therewith. As prepared by heretofore known processes, these coloring matters usually contain an undesirable amount of matter insoluble in benzene or other aromatic hydrocarbons or they lack the desired solubility in these solvents.

According to the present invention, new azo coloring matters are produced by coupling the diazo compounds of the arylamines or of the aminoazo derivative of the aromatic hydrocarbons, more particularly aminoazobenzene and its homologues, with a phenol, more particularly a naphthol, and especially beta-naphthol, in the presence of formaldehyde, or with the soluble condensation product or products which are probably formed by the action of formaldehyde on the phenol. The coloring matters thus obtained are more soluble in the aromatic hydrocarbons, oils, fats, waxes, etc., or are capable of giving superior colloidal or dispersed solutions or admixtures therewith, than the analogous products similarly produced in the absence of formaldehyde. In the production of the new coloring matters, the phenol is preferably treated with an excess of the diazo compound.

The coloring matters thus produced in the presence of formaldehyde usually contain a less amount of material insoluble in benzene and other aromatic hydrocarbons, or possess a greater solubility in these solvents, than when produced in the usual manner in the absence of formaldehyde. The property of being more soluble on the one hand and/or containing less insoluble material on the other is particularly advantageous in their commercial use for coloring oils, fats, soaps, waxes, etc.

The invention will be further illustrated by the following example, but it will be understood that the invention is not limited thereto. The parts are by weight.

Example: 118 parts of aminoazoxylene hydrochloride, having the probable formula

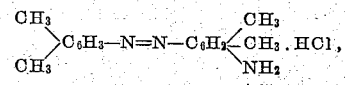

are diazotized in the usual way by means of about 28.5 parts of sodium nitrite, 100 parts of 20° Bé. hydrochloric acid, 400 parts of water and sufficient ice (about 100 parts) to maintain the solution at a temperature of about 0° to 7° C. This diazo solution is then introduced into a well-stirred solution maintained at a temperature of about 0° C. which has been prepared by heating a mixture of 28.8 parts of beta-naphthol and 40 parts of a 37 percent solution of formaldehyde to the boiling point, maintaining this temperature for about 2 to 5 minutes, and then adding it, i. e., the formaldehyde naphthol solution, to about 60 parts of caustic soda dissolved in about 300 parts of water containing about 100 parts of ice. The diazo solution is added to the beta-naphthol solution until a sample of the reaction mixture spotted on bibulous paper gives no reaction with a diazotized para-nitraniline solution. When this point is reached, there is added an extra amount of diazo solution corresponding to about 10 to 15 percent of the amount already added, and the mixture is stirred at a temperature of about 0° C. for about 3 to 4 hours. It is then diluted with about 600 parts of water and stirred at ordinary temperature for about 10 to 12 hours to decompose the excess diazo compound, after which the precipitate is filtered off and washed first with cold water and then with hot water, and then dried.

The coloring matter thus obtained, and in the dry and pulverized state, is a dark powder insoluble in water and readily soluble in benzene and other aromatic hydrocarbons with but little, if any, residue. It also dissolves in oils, fats, waxes, soaps, etc., giving somewhat yellower shades than the analogous coloring matter similarly produced in the absence of formaldehyde.

It may be pointed out that approximately one and eight-tenths, or thereabouts, molecular proportions of diazotized aminoazoxylene are added to one molecular proportion of beta-naphthol before a test shows the absence of the latter. The extra 12 to 13 percent of diazotized aminoazoxylene added to the beta-naphthol gives a final approximate proportion of about two moles of the former to one of the latter. This proportion may vary considerably but the best results are obtained by employing an excess of the diazo compound over that apparently required to combine with the beta-naphthol compound.

It may be further pointed out that it is not definitely known whether the beta-naphthol merely dissolves in the formaldehyde without reaction or whether a soluble condensation product is formed between the formaldehyde and beta-naphthol. But it is to be understood that the scope of the invention includes either or both cases.

In a similar manner, coloring matters may be obtained by using other diazo compounds such as, for example, the diazo compounds of anilines and its homologues, naphthylamine and its homologues, and aminoazobenzene and its homologues or analogues, and other phenols or naphthols or their isomers or homologues.

In the claims, it will be understood that the term "arylamino body" denotes and includes aniline and its homologues, naphthylamine and its homologues, and aminoazo compounds containing only aromatic hydrocarbon residues of the benzene or naphthalene series; and the term "nuclear hydroxy-derivative of a hydrocarbon included within the benzene and naphthalene series" denotes and includes phenol, naphthol, their homologues and isomers which contain a hydroxyl group as a substituent in the nucleus.

I claim:

1. In the production of an azo coloring matter soluble in benzene, the process which comprises coupling a diazotized arylamino body with a nuclear hydroxy-derivative of a hydrocarbon included within the benzene and naphthalene series in the presence of formaldehyde.

2. In the production of an azo coloring matter soluble in benzene, the process which comprises subjecting a soluble composition resulting from the treatment of a nuclear hydroxy-derivative of a hydrocarbon included within the benzene and naphthalene series with formaldehyde to the action of a diazotized arylamino body in the presence of caustic alkali.

3. In the production of an azo coloring matter soluble in benzene, the process which comprises coupling a diazotized arylamino body in the presence of caustic alkali with a nuclear hydroxy-derivative of a hydrocarbon of the naphthalene series dissolved in formaldehyde.

4. In the production of an azo coloring matter soluble in benzene, the process which comprises treating a soluble naphthol composition, prepared by subjecting the nuclear hydroxy-derivative of a hydrocarbon of the naphthalene series to the action of formaldehyde, with an excess of a diazotized aminoazo body of the benzene series in the presence of caustic alkali.

5. In the production of an azo coloring matter soluble in benzene, the process which comprises heating beta-naphthol with a formaldehyde solution, adding the resulting solution to an excess of caustic soda and then treating the solution thus obtained with a solution of diazotized aminoazoxylene in excess of the amount capable of combining with the beta-naphthol compound present.

6. As new products, the azo coloring matters obtainable by coupling in an alkaline medium a diazotized arylamino body with a soluble composition resulting from the treatment of a nuclear hydroxy-derivative of a hydrocarbon included within the benzene and naphthalene series with formaldehyde, said products being in the dry state insoluble in water and soluble in benzene giving colored solutions.

7. As new products, the azo coloring matters obtainable by dissolving a nuclear hydroxy-derivative of a hydrocarbon of the naphthalene series in a formaldehyde solution, subsequently adding this solution to an excess of caustic soda solution, and treating the solution thus obtained with an amount of a diazotized arylamino body in excess of that which combines with the naphthol body, said azo coloring matters being insoluble in water and soluble in benzene to give a colored solution.

8. As a new product, the azo coloring matter obtainable by treating with an excess of diazotized amino-azoxylene in the presence of caustic soda the soluble product obtained by treating beta-naphthol with formaldehyde; said product in the dry and pulverized state being a dark powder insoluble in water and soluble in benzene with a yellow color.

9. Material colored with a coloring matter of claim 6.

10. Material colored with a coloring matter of claim 7.

11. Material colored with a coloring matter of claim 8.

12. In the production of an azo coloring matter soluble in benzene, the process which comprises treating a nuclear hydroxy-derivative of a hydrocarbon included within the benzene and naphthalene series with a formaldehyde solution to form a soluble composition, and subjecting the resulting soluble composition to the coupling action of a diazotized homologue of aminoazobenzene.

13. In the production of an azo coloring matter soluble in benzene, the process which comprises treating a naphthol with a formaldehyde solution to form a soluble composition, and subjecting the resulting soluble composition to the coupling action of a diazotized aminoazobenzene which contains a methyl group as a substituent in the benzene nucleus.

14. As a new product, the azo coloring matter obtainable by treating a nuclear hydroxy-derivative of a hydrocarbon included within the benzene and naphthalene series with a formaldehyde solution to form a soluble composition and coupling the resulting soluble composition with a diazotized homologue of aminoazobenzene, said coloring matter being insoluble in water and soluble in benzene to give a colored solution.

15. As a new product, the azo coloring matter obtainable by treating a naphthol with a formaldehyde solution to form a soluble composition and coupling the resulting soluble composition with a diazotized aminoazobenzene which contains a methyl group as a substituent in the benzene nucleus, said coloring matter being insoluble in water and soluble in benzene to give a colored solution.

16. Material colored with the azo coloring matter of claim 14.

17. Material colored with the azo coloring matter of claim 15.

18. In the production of an azo coloring matter soluble in benzene, the process which comprises treating a nuclear hydroxy-derivative of a hydrocarbon of the naphthalene series with a formaldehyde solution to form a soluble composition, and subjecting the resulting soluble composition to the coupling action of a diazotized aminoazobenzene which contains a methyl group as a substituent in the benzene nucleus.

19. As a new product, the azo coloring matter obtainable by treating a nuclear hydroxy-derivative of a hydrocarbon of the naphthalene series with a formaldehyde solution to form a soluble composition and coupling the resulting soluble composition with a diazotized aminoazobenzene which contains a methyl group as a substituent in the benzene nucleus, said coloring matter being insoluble in water and soluble in benzene to give a colored solution.

20. Material colored with the azo coloring matter of claim 19.

In testimony whereof I affix my signature.

LEON W. GELLER.